March 8, 1927.
J. J. KEARNEY
1,620,029
SWIVEL SOCKET CLOSURE
Filed Aug. 23, 1926
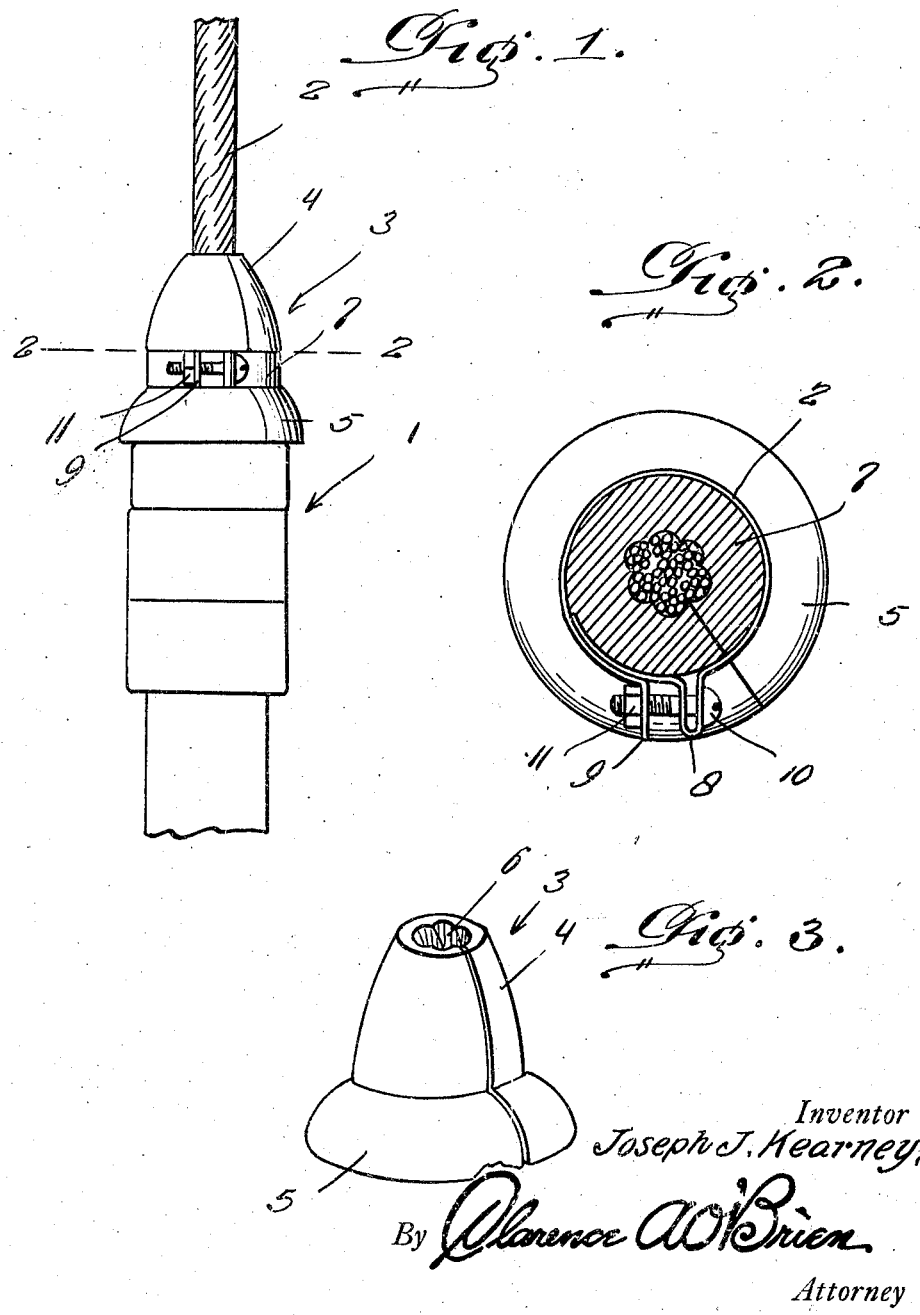
Inventor
Joseph J. Kearney,
By Clarence A. O'Brien
Attorney Patented Mar. 8, 1927.

1,620,029

UNITED STATES PATENT OFFICE.

JOSEPH J. KEARNEY, OF HENRYETTA, OKLAHOMA.

SWIVEL-SOCKET CLOSURE.

Application filed August 23, 1926. Serial No. 130,949.

This invention relates to a new product of manufacture for use on a wire line of a cable drill such as is used in association with oil and gas wells, and it has more particular reference to an appliance which is adapted to cooperate with a swivel socket on said line, in such a manner as to keep cavings such as dirt and lime, sand and other foreign substances away from the mouth of the swivel socket.

My principal aim is to provide a device of this class which is of utmost simplicity in construction, whereby to render it advantageous from the standpoint of cost of manufacture, quantity of output, ease in machining, and convenience and compactness.

Briefly, the invention simply comprises an especially designed body which is split to permit it to be readily placed upon the cable in close proximity to the swivel, and a special resilient clamping band for holding it in place.

Other features and advantages of the invention will become apparent from the following drawings and the description.

In the accompanying drawing forming a part of this application, and in which like numerals are employed to designate like parts throughout the same:—

Figure 1 is a side view of a device constructed in accordance with this invention, showing the manner in which the same is used.

Fig. 2 is an enlarged cross section taken approximately upon the plane of the line 2—2 of Fig. 1.

Fig. 3 is a perspective view of the body with the clamp removed.

Referring to the drawing, the reference character 1 designates generally the swivel joint which includes the customary swivel socket and the reference character 2 designates the wire line or cable. The improved device, is generally represented by the reference character 3 and as before indicated, it comprises a body, preferably of rubber, shaped to provide a truncated conical portion 4 and a circular outstanding base flange 5.

The body is split longitudinally to permit it to be readily applied upon the cable and in order to accommodate the cable it is provided with a central bore 6, the wall of which is molded to accommodate the wrappings of the cable.

Surrounding the body adjacent the flange is a resilient clamping band 7 having a U-shaper portion 8 adjacent one edge and having a right angular extremity 9 at its opposite end. A bolt 10 passes through the U-shaped portion and then through an opening in the right angular portion.

A nut 11 is threaded on the end of the bolt and bears against the portion 9. The end portions of the band are disposed in overlapping slidable relation to permit contraction and expansion according to the adjustment of the bolt.

In practice, the device is placed upon the wire cable or line adjacent and in association with the swivel joint as shown in Fig. 1, and the bolt on the clamping band is placed to draw the band tightly about the body, whereby to clamp the body firmly about the cable and down upon the swivel socket, thus preventing accumulation of extraneous matter in said socket.

The advantages and features of a device of this kind will no doubt be clear from the description and drawings, and therefore, a more lengthly description is thought unnecessary.

While the preferred embodiment of the invention has been shown and described, it is to be understood that minor changes coming within the field of invention claimed may be resorted to if desired.

Having thus described my invention, what I claim as new is:—

1. As a new product of manufacture, a swivel socket closure comprising a body of resilient material comprising a central longitudinal bore for reception of a cable line, the wall of the bore being corrugated to correspond to the corrugations of the cable, said body being longitudinally split, and a resilient clamping device for holding the split portions firmly about the cable.

2. In a structure of the class described, a resilient body including an upper frusto-conical portion and an outstanding circular base flange, said body being longitudinally split and formed with a central longitudinal bore, the wall of which is corrugated to accommodate the corrugations of the cable, and a resilient clamping band surrounding the body adjacent said flange, said band having its free end portions disposed in overlapping slidable relation, said end portions being provided with outstanding parts, and a clamping bolt passing through said parts for moving them toward and from each other to adjust the band.

In testimony whereof I affix my signature.

JOSEPH J. KEARNEY.